Oct. 6, 1959     H. S. DETWILER ET AL     2,907,810
BATTERY HOLDER FOR ELECTRIC WRIST WATCHES
Filed Feb. 7, 1956

INVENTOR
Harry S. Detwiler
Oscar R. Petters
Harwell B. Thompson

BY *M. T. Gould*

ATTORNEY

United States Patent Office 2,907,810
Patented Oct. 6, 1959

2,907,810

BATTERY HOLDER FOR ELECTRIC WRIST WATCHES

Harry S. Detwiler, Lancaster, Oscar R. Petters, Lancaster County, and Harwell B. Thompson, Lancaster, Pa., assignors to Hamilton Watch Company, Lancaster, Pa., a corporation of Pennsylvania Application February 7, 1956, Serial No. 563,927

10 Claims. (Cl. 136—173)

This invention relates to a quick detachable clip for holding a battery in a wrist watch.

In the making of an electric wrist watch operated by a battery, such as, for example, a watch of the general type shown in assignee's copending application Serial No. 409,943, filed February 12, 1954, and now Patent No. 2,888,797, it is necessary to house the battery within the confines of the case of the watch and to provide means whereby the battery may be replaced quickly and easily, the electrical connections being made automatically without disturbing in any way the functional parts of the watch.

The object of the present invention is to provide a spring clip which may be attached to the movement quickly and easily and which will, in addition, serve as a ground connection for the battery.

It is a further object of the present invention to provide a quick detachable clip for supporting a battery in an electric wrist watch in such a manner that shocks or vibration cannot dislodge it.

It is a further object of the present invention to provide a clip for holding a battery which may be reused with a new battery.

The invention is shown in the accompanying drawing in which.

Figure 1:
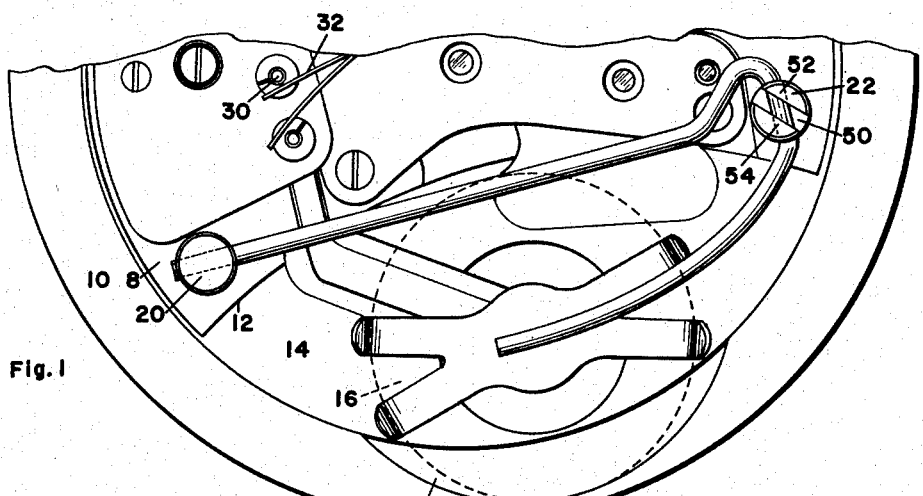
Figure 1 is a top plan view of a portion of the pillar plate and movement holding ring showing the battery clip in position with the battery in dotted lines.
Figure 2:
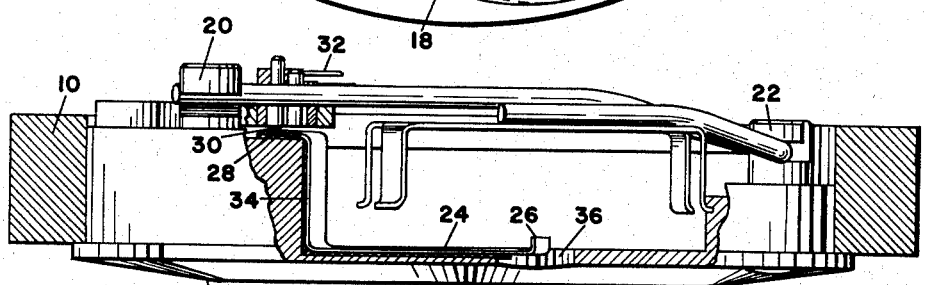
Figure 2 is a side elevation of the same with parts in section to show the electrical connectors.
Figure 3:
Figure 3 is a perspective view of the battery clip holding a battery.
Figure 4:
Figure 4 is a similar view showing the actual size of the battery.
Figure 5:
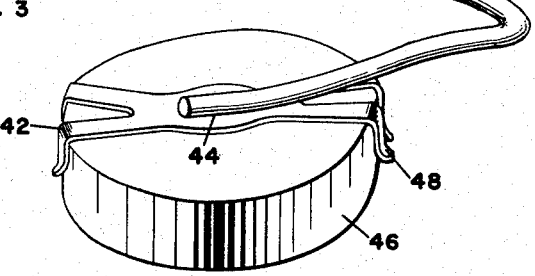
Figure 5 is a vertical cross section of one of the posts.

Referring particularly to the drawings, a pillar plate 8 is shown mounted in a movement holding ring 10 and terminates in an arcuate shaped curve 12 to provide a space 14 to receive a battery 16. The movement holding ring 10 is cut away to provide a complementary arcuate space 18 to receive that portion of the battery extending beyond the pillar plate. Posts 20 and 22 are mounted in the pillar plate and serve to retain the spring wire of the battery holding clip in position.

The bottom plate of the battery, which serves as the anode, is insulated from the outer battery case in a conventional manner, and contacts the resilient strip 24 at the end 26, the other end of the resilient strip 28 contacting a pin or contact post 30 which carries the contact making spring arm 32. The pin 30 is insulated from the pillar plate as described in detail in assignee's copending application Serial No. 551,791, filed December 8, 1955. The strip 24 is also insulated from the pillar plate by an adhesive insulating substance 34 carried between it and the pillar plate, while a hole 36 in the pillar plate directly below the end 26 allows the end to be depressed to provide a firm contact against the bottom plate or anode of the battery due to the resiliency of the strip 24.

The battery clip 38 is formed of a piece of spring wire 40 and a holder 42. The two are attached at 44 by welding or soldering so that they act as a single piece. The battery 46 is snapped into the holder, the turned ends 48 of the holder engaging the sides of the battery and making electrical connection between the holder and the outer battery case.

The post 22 has a channel 50 cut in the top for the reception of the spring wire 40, the head of the post being cut away at 52 and 54 to receive the spring wire after it has been inserted in the channel and given a slight turn. The post 20 is formed with a hole 58 and a channel 56 terminating tangent to the far side of the hole 58 which together form a connecting slot adapted to receive the end of the spring wire 40 and to retain such spring wire.

To install a new battery the old battery is removed from the holder 42 and the new battery pressed into the holder and held by the spring fingers 48 and the spring wire inserted in the channel 50. The spring wire is then given a ¼ turn to engage it in the cut out portion 52 and 54 and the end of the spring wire is inserted in the slot 56 and into the section of slot formed by hole 58. The resiliency of the wire and its tendency to move upward retains the spring in the upper position of the slot.

What is claimed is:

1. In an electric watch having a pillar plate and a battery mounted thereon, a clip holder releasably engaging said battery in electric contact with one electrode thereof, mounting means protruding from said pillar plate, an elongated spring releasably held by said mounting means and having one end thereof secured to said holder to support said holder and establish an electrical connection between said holder and said mounting means, and contact means mounted on said pillar plate and insulated therefrom engaging the other electrode of said battery.

2. In an electric watch as set out in claim 1, said holder having ends bent at an angle to its main portion, said legs engaging opposite sides of said battery so that said battery may be lifted by lifting said spring.

3. In an electric watch having a pillar plate and a battery mounted thereon, a clip holder releasably engaging said battery in electric contact with one electrode thereof, a pair of spaced posts mounted on said pillar plate, an elongated spring releasably held by said posts and having one end thereof secured to said holder to support said holder and establish an electric connection between said holder and at least one of said posts, and contact means mounted on said pillar plate and insulated therefrom engaging the other electrode of said battery.

4. In an electric watch as set out in claim 3, wherein said pillar plate has an aperture therein and said battery is mounted with said other electrode over said aperture, said contact means being elongated and extending out over said aperture.

5. In an electric watch as set out in claim 3, said spring being generally U-shaped and having a straight leg held by one of said posts and a bent portion held by the other of said posts.

6. In an electric watch as set out in claim 3, said posts having cutaway portions extending into the sides thereof for receiving said spring.

7. In an electric watch as set out in claim 3, said holder having a back portion attached to said spring and oppositely disposed legs bent from said back portion and engaging oppositely disposed sides of said battery.

8. In an electric watch as set out in claim 7, said spring being generally U-shaped and having a straight leg held by one of said posts and a bent portion held by the other of said posts.

9. In an electric watch as set out in claim 8, said posts having cutaway portions extending into the sides thereof for receiving said spring.

10. In an electric watch as set out in claim 9, said pillar plate having an aperture therein, said battery being mounted with said other electrode over said aperture, said contact means being elongated and extending out over said aperture.

References Cited in the file of this patent
UNITED STATES PATENTS

| | | |
|---|---|---|
| 796,517 | Jackson | Aug. 8, 1905 |
| 2,449,550 | Eichberg et al. | Sept. 21, 1948 |
| 2,449,568 | Shiro et al. | Sept. 21, 1948 |
| 2,692,944 | Mendelson | Oct. 26, 1954 |